(12) United States Patent
Arora

(10) Patent No.: US 12,535,324 B2
(45) Date of Patent: Jan. 27, 2026

(54) METHOD AND SYSTEM FOR GUIDING PEOPLE TO DESIRED LOCATIONS WITHIN AN ENVIRONMENT

(71) Applicant: HCL Technologies Limited, New Delhi (IN)

(72) Inventor: Deep Arora, Sunnyvale, CA (US)

(73) Assignee: HCL Technologies Limited, New Delhi (IN)

( * ) Notice: Subject to any disclaimer, the term of this patent is extended or adjusted under 35 U.S.C. 154(b) by 103 days.

(21) Appl. No.: 18/398,298

(22) Filed: Dec. 28, 2023

(65) Prior Publication Data
US 2024/0219183 A1    Jul. 4, 2024

(30) Foreign Application Priority Data

Jan. 1, 2023   (IN) .............................. 202311000056

(51) Int. Cl.
*G01C 21/20*   (2006.01)
*G06K 7/10*    (2006.01)
(Continued)

(52) U.S. Cl.
CPC ....... *G01C 21/206* (2013.01); *G06K 7/10366* (2013.01); *G06K 7/1413* (2013.01);
(Continued)

(58) Field of Classification Search
CPC ............. G01C 21/206; G06K 7/10366; G06K 7/1413; G06K 7/1417; G06T 19/003; G06T 2200/24
(Continued)

(56) References Cited

U.S. PATENT DOCUMENTS 10,156,446 B2 * 12/2018 Liu .......................... H04L 67/02
10,636,207 B1 *  4/2020 Swidersky ........... G01C 21/383
(Continued)

FOREIGN PATENT DOCUMENTS

JP    2002163691 A    6/2002
JP    2011215725 A   10/2011
KR     101603873 B1   3/2016

OTHER PUBLICATIONS

Jennifer Bradley; New Boarding Pass Scanners Guide Passengers to Gates & Concessions at Boston Logan; Mar.-Apr. 2014; Boston Logan.
(Continued)

*Primary Examiner* — Joshua E Rodden
(74) *Attorney, Agent, or Firm* — Kendal M. Sheets

(57) ABSTRACT

A method for guiding a user to desired locations within an environment is disclosed. In some embodiments, the method includes receiving data corresponding to the environment from a machine-readable mark in response to scanning the machine-readable mark. The data corresponding to the environment includes geographical information associated with the environment. The method further includes receiving a user input for a desired location within the environment. The method further includes iteratively determining a current location of a user within the environment in response to receiving the user input and extracting spatial data of the desired location within the environment from the geographical information. The method further includes dynamically and iteratively generating a mixed reality route to the desired location overlaid over the environment.

17 Claims, 15 Drawing Sheets

(51) Int. Cl.
*G06K 7/14* (2006.01)
*G06T 19/00* (2011.01)
(52) U.S. Cl.
CPC .......... *G06K 7/1417* (2013.01); *G06T 19/003* (2013.01); *G06T 2200/24* (2013.01)
(58) Field of Classification Search
USPC ........................................................ 701/418
See application file for complete search history.

(56) References Cited

U.S. PATENT DOCUMENTS

| | | | | |
|---|---|---|---|---|
| 11,959,763 | B1* | 4/2024 | Zorluoglu | G01C 21/362 |
| 2010/0125406 | A1* | 5/2010 | Prehofer | G01C 21/3641 |
| | | | | 705/323 |
| 2011/0288768 | A1 | 11/2011 | Stefani et al. | |
| 2013/0211718 | A1* | 8/2013 | Yoo | G01C 21/206 |
| | | | | 701/523 |
| 2014/0018112 | A1* | 1/2014 | Cohen-Zur | H04W 4/04 |
| | | | | 455/457 |
| 2014/0209671 | A1* | 7/2014 | Finlow-Bates | G09B 29/10 |
| | | | | 235/375 |
| 2014/0278097 | A1* | 9/2014 | Khorsheed | G01C 21/206 |
| | | | | 701/533 |
| 2015/0095350 | A1* | 4/2015 | Chen | G06F 16/29 |
| | | | | 707/755 |
| 2016/0109242 | A1* | 4/2016 | Applegate | G01C 21/206 |
| | | | | 701/431 |
| 2017/0372010 | A1* | 12/2017 | Doherty | G16H 40/67 |
| 2020/0218863 | A1* | 7/2020 | Huo | G06K 7/10722 |
| 2023/0273027 | A1* | 8/2023 | Deynega | G01C 21/005 |
| | | | | 701/420 |

OTHER PUBLICATIONS

Pavithra Babu; 10 Airports Using Beacons to Take Passenger Experience to the Next Level; Oct. 10, 2021.

* cited by examiner

METHOD AND SYSTEM FOR GUIDING PEOPLE TO DESIRED LOCATIONS WITHIN AN ENVIRONMENT

TECHNICAL FIELD

This disclosure relates generally to location-based path generation, and more particularly to method and system for guiding people to desired locations within an environment.

BACKGROUND

With the rapid development of the economy, airports are also growing in size. People often have difficulty in performing one or more activities within the airport, such as, baggage management, security clearance, check-in, finding any particular stores and shops within the airport, finding security check-in gate, finding allocated boarding gate within the airport, and the like. However, with advancement in current technologies air travel experience of passengers has been drastically enhanced. For example, the use of biometrics technology within current airport process enables passengers to perform activities, such as, enabling secure check-in securely via their smartphone from their home, and the like.

However, none of the existing techniques enables the passenger to guide to desired locations within the airport. In addition, none of the existing technique provides information to the passenger about overall time required to reach to the desired location within the airport. By way of example, when a person arrives at the airport, multiple procedures are carried out in a predefined order at various places, such as security checkpoints, immigration checkpoints, and boarding gate, etc. All these procedures are very time-consuming and carried out at different-different locations. Further, people need to go to each checkpoint one by one in order to board their flights. However, for some passengers that are not frequent travelers, the process of boarding the flight becomes strenuous as the passengers are not aware about the routes within the airport, and time required to reach each checkpoint, especially for boarding gates. Moreover, this problem enhances during connecting flights, as the passengers might be somewhat familiar with their departure and end arrival airports but not with connecting airport.

Therefore, there is a need of efficient and reliable method and system for guiding people to reach desired locations within the airport.

SUMMARY OF INVENTION

In an embodiment, a method for guiding a user to desired locations within an environment is disclosed. The method may include receiving data corresponding to the environment from a machine-readable mark in response to scanning the machine-readable mark. It should be noted that, the data corresponding to the environment may include geographical information associated with the environment. The method may further include receiving a user input for a desired location within the environment. The method may further include iteratively determining a current location of the user within the environment in response to receiving the user input. The method may further include extracting spatial data of the desired location within the environment from the geographical information. The method may further include dynamically and iteratively, generating a mixed reality route to the desired location overlaid over the environment. It should be noted that, the mixed reality route may include directions to reach the desired location.

In another embodiment, a system for guiding a user to desired locations within an environment is disclosed. The system includes a processor and a memory communicatively coupled to the processor. The memory may store processor-executable instructions, which, on execution, may cause the processor to receive data corresponding to the environment from a machine-readable mark in response to scanning the machine-readable mark. It should be noted that, the data corresponding to the environment may include geographical information associated with the environment. The processor-executable instructions, on execution, may further cause the processor to receive a user input for a desired location within the environment. The processor-executable instructions, on execution, may further cause the processor to iteratively determine a current location of a user within the environment in response to receiving the user input. The processor-executable instructions, on execution, may further cause the processor to extract spatial data of the desired location within the environment from the geographical information. The processor-executable instructions, on execution, may further cause the processor to dynamically and iteratively, generate a mixed reality route to the desired location overlaid over the environment. It should be noted that the mixed reality route may comprise directions to reach the desired location.

In yet another embodiment, a non-transitory computer-readable medium storing computer-executable instruction for guiding a user to desired locations within an environment is disclosed. The stored instructions, when executed by a processor, may cause the processor to perform operations including receiving data corresponding to the environment from a machine-readable mark in response to scanning the machine-readable mark. It should be noted that the data corresponding to the environment may include geographical information associated with the environment. The operations may further include receiving a user input for a desired location within the environment. The operations may further include iteratively determining a current location of the user within the environment in response to receiving the user input. The operations may further include extracting spatial data of the desired location within the environment from the geographical information. The operations may further include dynamically and iteratively, generating a mixed reality route to the desired location overlaid over the environment. It should be noted that the mixed reality route may include directions to reach the desired location.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
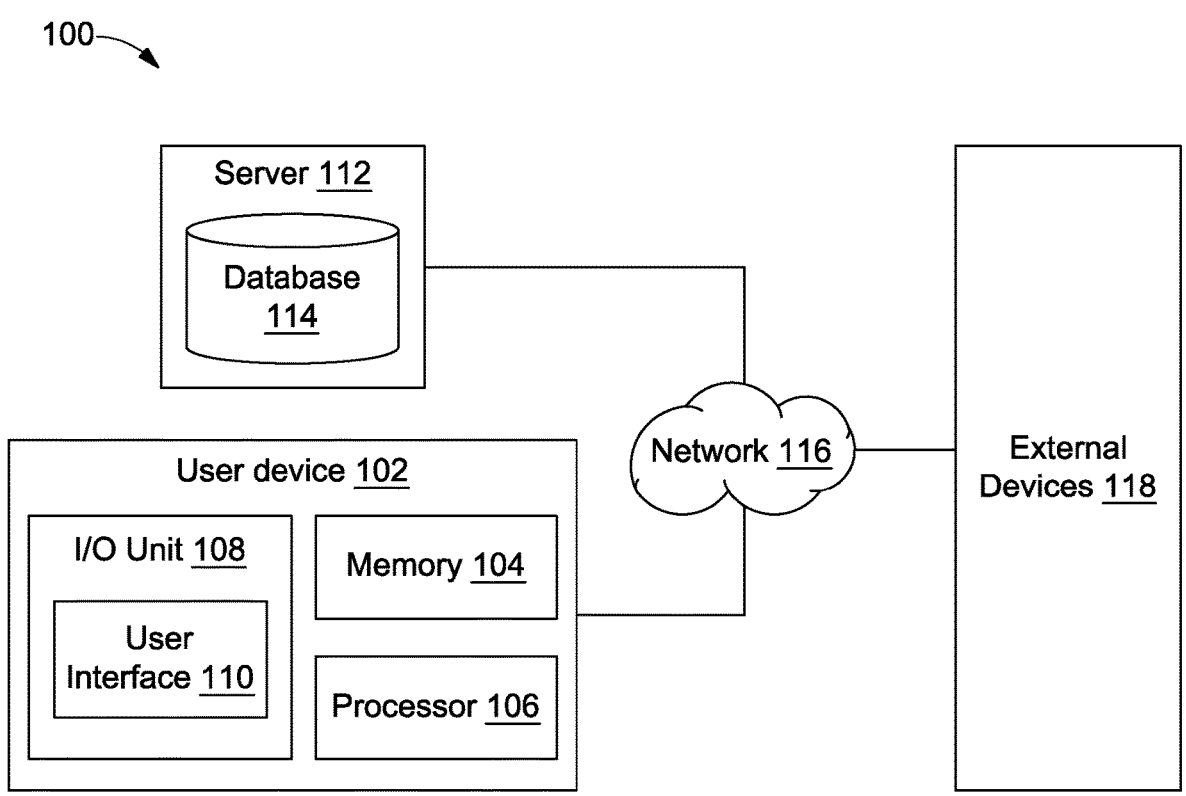
FIG. 1 illustrates a functional block diagram of a system configured to guide a user to desired locations within an environment, in accordance with an embodiment.

A functional block diagram of a system 100 configured to guide a user to desired locations within an environment is illustrated in FIG. 1, in accordance with an embodiment. The system 100 may be configured to guide a person to one or more desired locations within an environment. As will be appreciated the environment may include a public place. Examples of the public places may include, but are not limited to, an airport terminal, a railway station, a bus stand, a shopping mall, a hospital, and a park. The desired location may be a location within the environment, such as a boarding gate at an airport, a platform at a railway station, a store at a shopping mall, a multi-bed ward or a patient room at the hospital. In order to guide the person to the desired location with the environment, the system 100 may include a user device 102. Examples of the user device 102 may include, but are not limited to, a desktop, a laptop, a notebook, a tablet, a smartphone, and the like.

Initially, the user device 102 may receive data corresponding to the environment. In order to receive data of the environment, the user device 102 may be configured to scan a machine-readable mark cooperatively coupled to a document. The user device 102 may scan the machine-readable mark via a sensor. In an embodiment, when the user device 102 is the smartphone, the sensor may correspond to an image sensor of a camera of the user device 102. The machine-readable mark may be one of a bar code, a Quick Response (QR) code, and a Radio-frequency identification (RFID). By way of an example, when the environment is the airport, then the document may be a boarding pass of the user provided by an associated airlines during airport check-in. In this example, the machine-readable mark may be a QR code printed on the boarding pass. By way of another example, in some embodiment, when the environment is the railway station, the bus stand, or the hospital, then the document may be a train ticket, a bus ticket, or a visitor's pass issued by a hospital, respectively. Further, upon scanning the machine-readable mark, the user device 102 may be configured to extract data corresponding to the environment. In an embodiment, the data corresponding to the environment may include geographical information associated with the environment. The geographical information may include layout data of the environment. A method of scanning the machine-readable mark is further explained in detail in conjunction with FIG. 4.

In addition to the geographical information, upon scanning the machine-readable mark via the sensor of the user device 102, the user device 102 may receive data corresponding to the user from the machine-readable mark. Further, the user device 102 may receive a user input for a desired location within the environment. Upon receiving the user input for the desired location, the user device 102 may iteratively determine a current location of the user within the environment in response to receiving the user input. The user device 102 may determine the current location of the user based on the data received corresponding to the environment and the user. Further, the user device 102 may extract spatial data of the desired location within the environment from the geographical information of the environment. Upon extracting the spatial data of the desired location within the environment, the user device 102 may dynamically and iteratively generate a mixed reality route to the desired location overlaid over the environment. The mixed reality route may include a virtual path and directions to reach the desired location. A method of generating the mixed reality route to the desired location is further explained in detail in conjunction with FIG. 5.

Upon generating the mixed reality route to the desired location, the user device 102 may be further configured to display a list of neighborhood locations along the mixed reality route to the desired location based on the current location of the user. The user device 102 may be further configured to receive a user selection of a neighborhood location from the list of neighborhood locations. Further, upon receiving the user selection, the user device 102 may update the virtual path and the directions to the desired location based on the selected neighborhood location. A method of updating the virtual path and the directions based on the neighborhood location selected by the user is further explained in detail in conjunction with FIG. 6.

Further, the user device 102 may be configured to identify an occurrence of an activity associated with the user along the mixed reality route to the desired location within the environment. Upon identifying the occurrence of the activity associated with the user, the user device 102 may be configured to send a notification to a predefined contact (i.e., an emergency contact saved by the user). A method of sending a notification to the pre-defined contact is further explained in detail in conjunction with FIG. 7. The user device 102 may further include a memory 104, a processor 106, and an Input/Output (I/O) unit 108. The I/O unit 108 may further include a user interface 110. A user or an administrator may interact with the user device 102 and vice versa through the I/O unit 108.

The I/O unit 108 may be used to display results (i.e., data received corresponding to the user, layout data of the airport, the virtual path and directions, the list of neighborhood locations, an identified activity, and contact details of the pre-defined contact, etc.) based on actions performed by the user device 102, to the user. The user interface 110 may be used by the user to provide inputs to the user device 102. Thus, for example, in some embodiment, the user device 102 may ingest a user input corresponding to one or more desired locations within the environment for which the user wants to obtain the mixed reality route. Further, for example, in some embodiments, the user device 102 may render intermediate results (e.g., the data received corresponding to the user, the list of neighborhood locations, the identified activity, and the contact details, etc.) or final results (e.g., the virtual path and the directions) to the user via the user interface 110.

The memory 104 may store instructions that, when executed by the processor 106, may cause the processor 106 to display the virtual path and the directions to the desired location. As will be described in greater detail in conjunction with FIG. 2 to FIG. 14, in order to display the virtual path and the directions, the processor 106 in conjunction with the memory 104 may perform various functions including receiving data corresponding to the environment, receiving the user input for the desired location within the environment, iteratively determining the current location of the user within the environment, extracting spatial data of the desired location within the environment, dynamically and iteratively generating the mixed reality route to the desired location overlaid over the environment, etc.

The memory 104 may also store various data (e.g., data received corresponding to the environment, data received for the user, the current location of the user, contact details of the pre-defined contact, etc.) that may be captured, processed, and/or required by the user device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the user device 102 may interact with a server 112 or external devices 118 over a network 116 for sending and receiving various data. The network 116, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In an embodiment, the user device 102 may fetch geographical information including the layout data of the environment from the server 112. In some embodiment, the user device 102 may fetch data associated with the user from the server 112. In addition, the server 112 may provide spatial data associated with the desired locations to the user. The server 112 may further include a database 114. The database 114 may be a central database. For example, the database 114 may be central database of the airport. By way of an example, the database 114 may store geographical information associated with the environment. The database 114 may be periodically updated based on update in the geographical information of the environment. In other words, the database 114 may be updated based on the update in the layout data of the environment. Alternatively, the user device 102 may receive the user input from one of the external devices 118.

Figure 2:
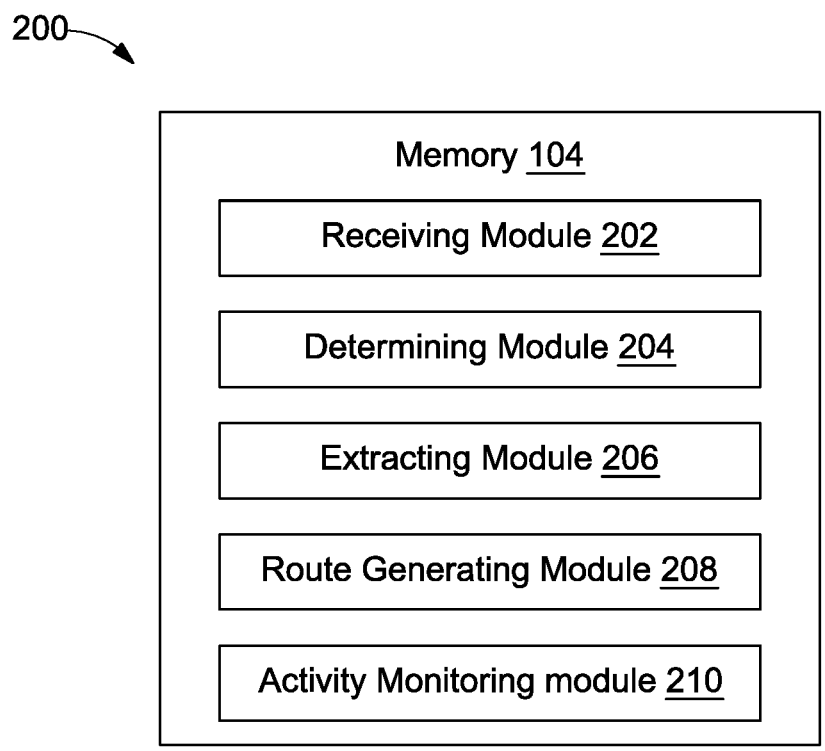
FIG. 2 illustrates a functional block diagram of various modules stored within a memory configured to guide a user to desired locations within an environment, in accordance with an embodiment.

Referring now to FIG. 2, a functional block diagram of various modules stored within in a memory 104 configured to guide a user to desired locations within an environment is illustrated, in accordance with some embodiment. With reference to FIG. 2, the memory 104 may correspond to the memory 104 of the user device 102. In order to guide a person to the desired location within the environment, the memory 104 may include a receiving module 202, a determining module 204, an extracting module 206, a route generating module 208, and an activity monitoring module 210.

The receiving module 202 may be configured to receive data corresponding to the environment and the user upon reading the machine-readable mark coupled to the document. By way of an example, when the environment is the airport and the document is the boarding pass issued to the user, then the data associated with the environment may correspond to the geographical information of the airport. Further, the geographical information may be a layout data of the airport. By way of an example, when the environment is the airport, the layout data of the airport may include airport terminals, terminal entry gates, waiting area, seating lounge, boarding gates, ticket counters, shopping stores, food stores, cafeteria, restrooms, runways, and the like.

Additionally, the data associated with the user may include personal details (e.g., name, age, gender, etc.) and flight details (e.g., origin, destination, departure time, flight time, seat number, and the like) of the user. With reference to FIG. 1, the receiving module 202 may receive the data associated with the environment and the user from the machine-readable mark, upon scanning the machine-readable mark by the sensor (e.g., the image sensor of the camera) of the user device 102. Further, the receiving module 202 may be configured to receive the user input for the desired location within the environment. In continuation to the above example, when the environment is the airport, then the desired location that the user may be the boarding gate. The receiving module 202 may be configured to send the environment data including the geographical location, the user data, and the user input to the determining module 204.

The determining module 204 may be configured to receive the environment data including the geographical information, the user data, and the user input form the receiving module 202. Further, the determining module 204 may be configured to determine the current location of the user within the environment in response to the user input received from the user. By way of an example, upon receiving the user input for the boarding gate, the determining module 204 may be configured to determine the current location of the user within the airport. In an embodiment, the determining module 204 may determine the current location of the user based the environment data and the user data.

Once the current location of the user is determined, the extracting module 206 may be configured to extract spatial data of the desired location within the environment. The extracting module 206 may extract the spatial data of the desired location from the geographical information corresponding to the environment. For example, the spatial data may include coordinate points, lines, longitude, latitude, polygon, slope angle, etc., that may represent a specific location within the environment. By way of an example, the extracting module 206 may retrieve the spatial data with respect to the desired location, i.e., the boarding gate within the airport.

Upon extracting the spatial data of the desired location within the environment, the route generating module 208 may be configured to dynamically and iteratively generate the mixed reality route to the desired location overlaid over the environment. The mixed reality route may include directions to reach the desired location. For example, the mixed reality route to reach the boarding gate may be generated by the route generation module 208, upon receiving the user input corresponding to the boarding gate within the airport. By way of an example, the mixed reality route may be a 3-dimensional (3D) route, virtual reality (VR) route, and an augmented reality (AR) route.

With reference to FIG. 1, when the user device 102 is the smartphone, then the mixed reality route generated by the route generating module 208 may be displayed to the user (e.g., a passenger) as a virtual path providing the directions to the user to reach the desired location, i.e., the boarding gate. Further, the route generating module 208 may be configured to identify a change in the current location of the user. Upon identifying the change in the current location of the user, the route generating module 208 may be configured to update the virtual path based on the identified change in the current location of the user.

Once the mixed reality route to the desired location is generated, the route generating module 208 may be configured to display a list of neighborhood locations along the mixed reality route to the user. In an embodiment, the list of neighborhood locations may be generated based on the current location of the user. By way of an example, in case when the desired location is the boarding gate, then the list of neighborhood locations may include a cafeteria, shopping stores, a pharmacy, a lounge, and a liquor shop, restrooms, etc. Upon displaying the list of neighborhood locations along the mixed reality route to the desired location, the route generating module 208 may receive the user selection of a neighborhood location from the list of neighborhood locations. The user may select the neighborhood location from the list of neighborhood locations based upon his interest and needs. Further, the route generating module 208 may be configured to update the virtual path and the directions to the desired location, based on the selected neighborhood location. It should be noted that, the virtual path and the directions updated based on the selected neighborhood location may include a virtual path and directions to the selected neighborhood location along the virtual path and the directions to reach the desired location.

The activity monitoring module 210 may be configured to identify the occurrence of the activity associated with the user along the mixed reality route to the desired location within the environment. Examples of the activity may include, but are not limited to, being stationary at a predefined location, falling, slipping, shouting, walking, climbing stairs, erratic biometric parameters, passing specific points of interest, running, or the like. By way of an example, when the environment is the airport and the desired location is the boarding gate, the activity performed by the user may be sitting in the waiting area, walking to the boarding gate, falling while walking etc.

Upon identifying the occurrence of the activity, the activity monitoring module 210 may be configured to extract values of at least one parameter associated with the activity based on data captured for the activity. Examples of the at least one parameter associated with the activity may include, but are not limited to, current location of the user, duration of performing the activity, body temperature of the user during the activity, intensity of performing the activity, and other related heath monitoring parameters during the activity, such as, blood pressure, acceleration, calories burnt, heart rate, or the like, of the user. Once the values of the at least one parameter associated with the activity is extracted, the activity monitoring module 210 may be configured to compare values of each of the at least one parameter with an associated predefined threshold. Further, based on comparison of the values of each of the parameter with the associated predefined threshold, the activity monitoring module 210 may be configured to send the notification to the predefined contact based on a result of the comparing. By way of an example, the sent notification may include a text message or an email to alert a person having the pre-defined contact about the activity. The text message may include a time when the activity happened and a location information (e.g., location where the activity happened and current location) of the user.

Figure 3:
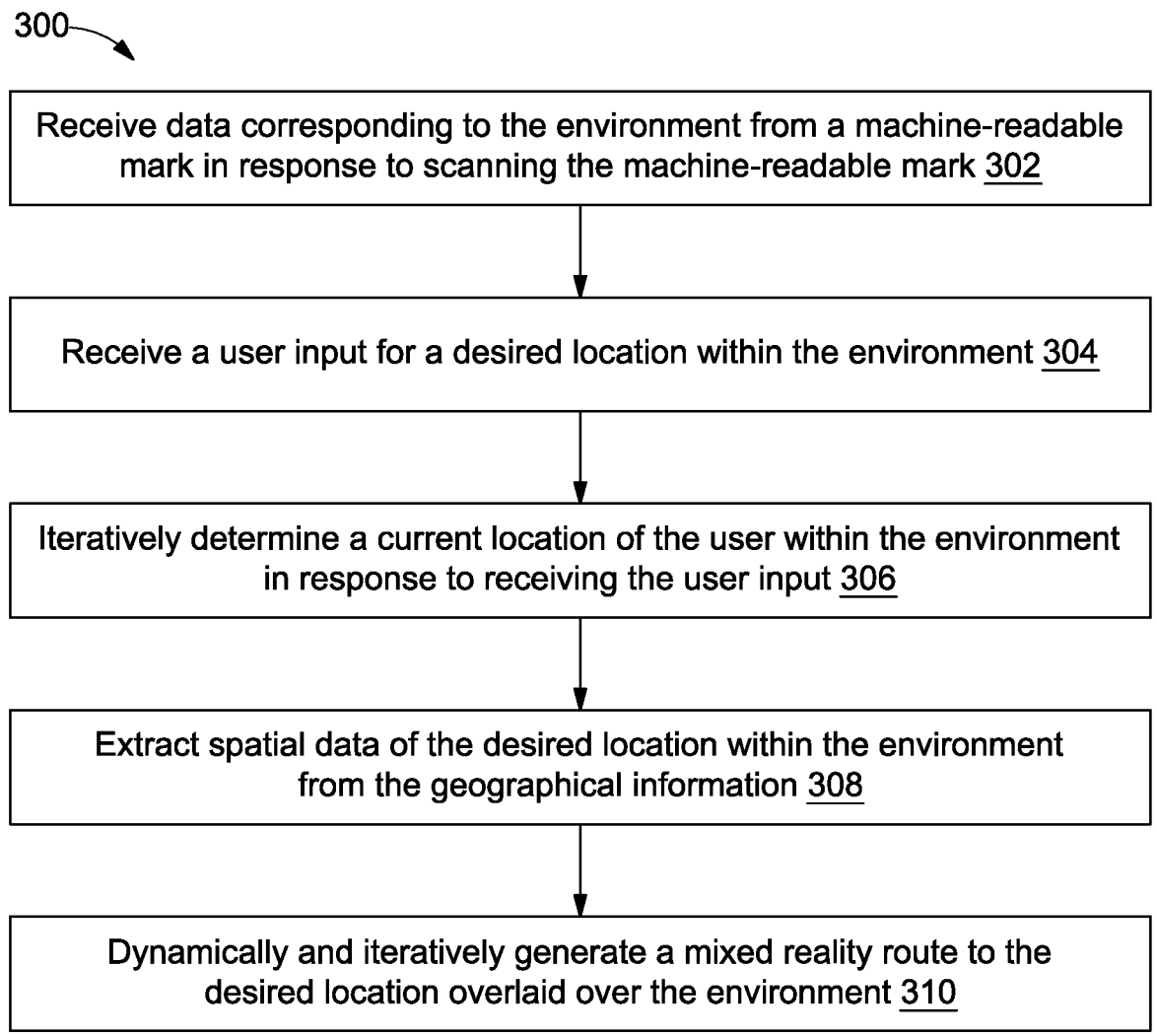
FIG. 3 illustrates a flowchart of a method for guiding a user to desired locations within an environment, in accordance with an embodiment.

Referring now to FIG. 3, a flowchart of a method 300 for guiding a user to desired locations within an environment is illustrated, in accordance with an embodiment. In order to guide the user to the desired locations within the environment, initially, at step 302, data corresponding to the environment may be received. The data corresponding to the environment may be received from a machine-readable mark in response to scanning the machine-readable mark. The data corresponding to the environment may include geographical information associated with the environment. In an embodiment, the machine-readable mark may be printed on a document, or a card issued to the user by concerned authorities of the associated environment. By way of an example, consider a scenario, where the user may be on an airport terminal of an airport, and may want to reach to a boarding gate to board a flight. In this scenario, the environment may be the airport. In addition, the machine-readable mark may be a QR code printed on a boarding pass issued to the user by an associated airline. Further, the data corresponding to the environment (i.e., the airport) may be retrieved by scanning the QR code printed on the boarding pass issued to the user.

By way of another example, consider another scenario where the user may be on a reception area of a hotel, and may want to go to a hotel room allotted to him. In this scenario, the environment may be hotel premise. Further, the machine-readable mark may be a QR code printed on a hotel key card provided to the user. In this case, the data corresponding to the environment (i.e., the hotel premise) may be received by scanning the QR code printed on the hotel key card. A method of scanning the machine-readable mark is further explained in detail in conjunction with FIG. 4.

Once the data corresponding to the environment is received, at step 304, a user input for a desired location may be provided by the user. In an embodiment, the desired location may be a location that the user may want to reach within the environment. In continuation to the above example, in the scenario where the environment is the airport, the desired location that the user wants to reach may be the boarding gate at the airport terminal. Further, the user input to reach the desired location, i.e., the boarding gate may be a user input of a boarding gate number printed on the boarding pass. In another scenario, where the environment is the hotel premise, the desired location that the user wants to reach may be the allotted hotel room. In this scenario, the user input may be a user input of the hotel room number allotted to him. In some embodiment, the desired location may be received directly from the machine-readable mark.

Upon receiving the user input for the desired location within the environment, at step 306, a current location of the user within the environment may be determined. With reference to FIG. 1, in an embodiment, the current location of the user may be determined by accessing location services of the user device 102. By way of an example, the current location of the user may be the airport terminal at the airport. Further, at step 308, spatial data of the desired location within the environment may be extracted. In an embodiment, the spatial data of the desired location may be extracted from the geographical information. For example, the spatial data may include coordinate points, lines, longitude, latitude, polygon, slope angle, etc., that may represent a specific location within the environment.

Once the spatial data of the desired location is extracted, at step 310, a mixed reality route to the desired location may be generated. The generated mixed reality route may be overlaid on the environment. In an embodiment, the mixed reality route may be dynamically and iteratively generated based on the current location of the user and the spatial data extracted for the desired location. Further, the mixed reality route may include directions to reach the desired location. By way of an example, the mixed reality route may be a 3-dimensional (3D) route, a virtual reality (VR) route, and an augmented reality (AR) route. A method for generating the mixed reality route to the desired location is further explained in detail in conjunction with FIG. 5. In addition, the method of guiding the user to the desired location within the environment is further explained in detail via an exemplary embodiment in conjunction with FIG. 8 to FIG. 14.

Figure 4:
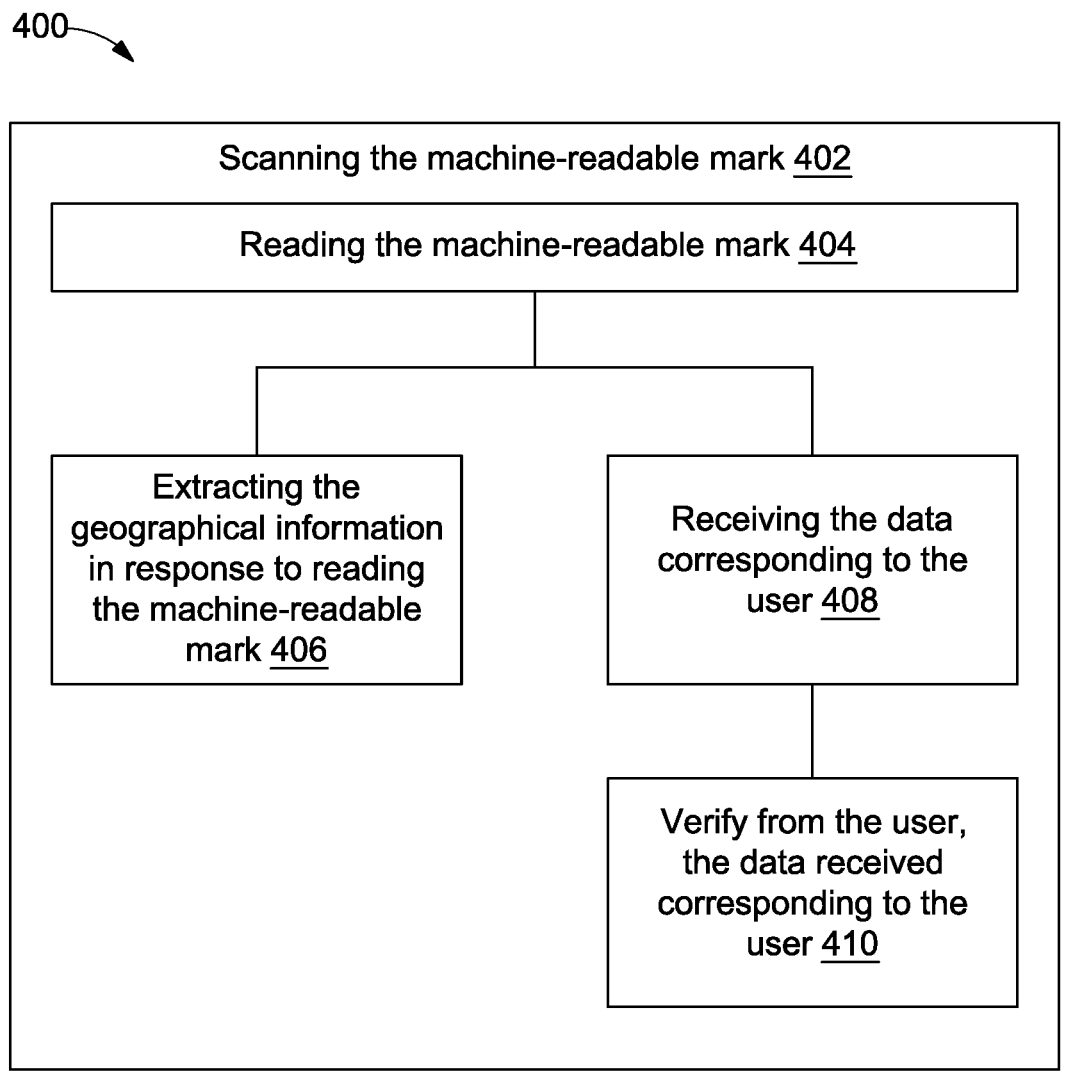
FIG. 4 illustrates a flowchart of a method for scanning a machine-readable mark, in accordance with an embodiment.

Referring now to FIG. 4, a flowchart of a method 400 for scanning a machine-readable mark is illustrated, in accordance with an embodiment. With reference to FIG. 3, in order to receive the environment data from the machine-readable mark as mentioned via the step 302, initially, at step 402, the machine-readable mark may be scanned. The machine-readable mark may be one of a bar code, a QR code, and an RFID. By way of an example, the machine-readable mark may be the QR code printed on the boarding pass issued to the user by the associated airline. With reference to FIG. 1, the machine-readable mark may be scanned via the sensor of the user device 102. For example, when the user device 102 is a smartphone, the sensor may be an image sensor of a camera of the user device 102.

Upon scanning the machine-readable mark, at step 404, the machine-readable mark may be read. Further, based on reading the machine-readable mark, at step 406, the geographical information of the environment may be extracted. The geographical information may include layout data of the environment. By way of an example, when the environment is the airport, the layout data of the airport may include airport terminals, terminal entry gates, waiting area, seating lounge, boarding gates, ticket counters, shopping stores, food stores, cafeteria, restrooms, runways, and the like.

In addition to extraction of the geographical information of the environment, at step 408, data corresponding to the user may also be extracted upon reading the machine-readable mark. As mentioned above, when the environment is the airport and the desired location is the boarding gate, the data corresponding to the user may include personal details and flight details of the user. By way of an example, the personal details of the user may include name, age, gender, etc. In addition, the flight details of the user may include origin, destination, departure time, arrival time, seat no., class, etc.

Once the data associated with the user is extracted, at 410, the extracted data corresponding to the user may be verified by the user based on one or more verification check. By way of an example, in order to verify the data associated with the user, the user may need to manually check an actual data (e.g., his name, age, seat no., etc.,) against the user data extracted by reading the machine-readable mark.

Figure 5:
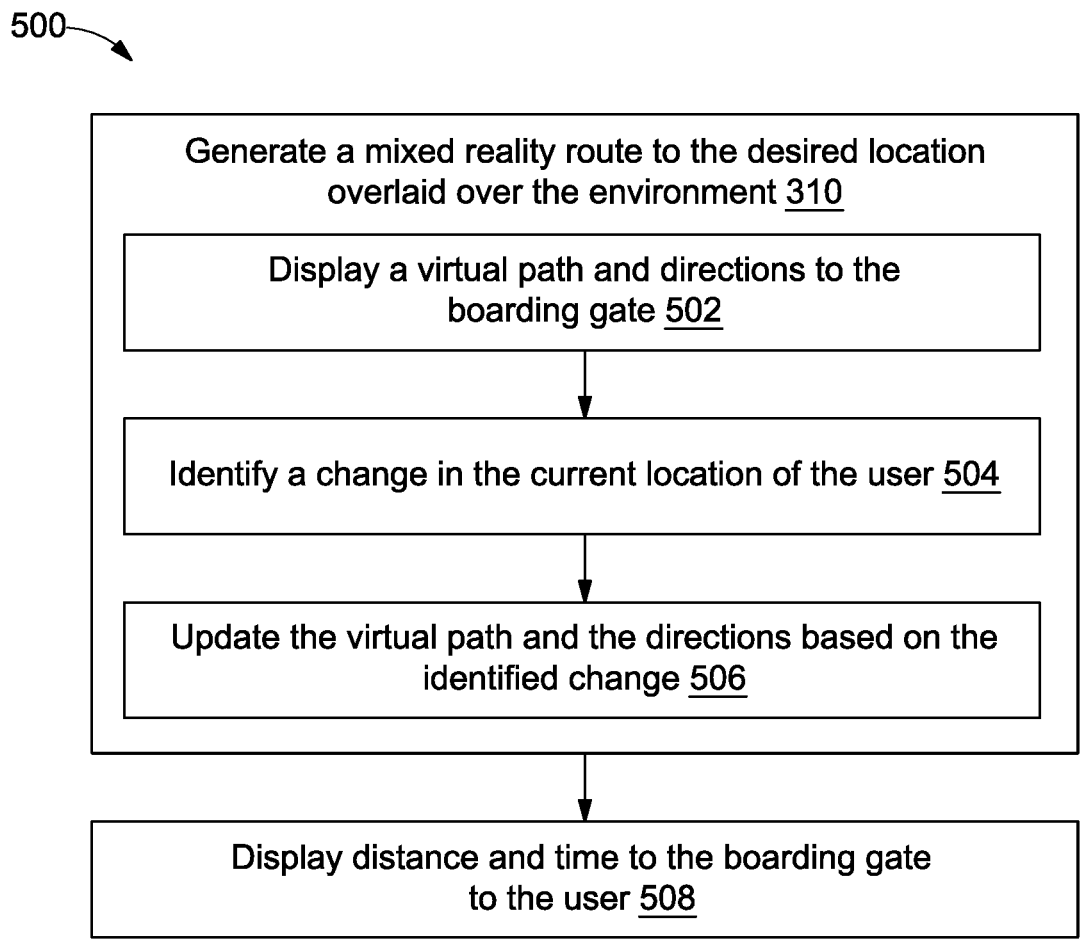
FIG. 5 illustrates a flowchart of a method of generating a mixed reality route to a desired location, in accordance with an embodiment.

Referring now to FIG. 5, a flowchart of a method 500 of generating a mixed reality route to a desired location is illustrated, in accordance with an embodiment. With reference to FIG. 3, in order to generate the mixed reality route to the desired location, i.e., the boarding gate as mentioned via the step 310, at step 502, a virtual path and the directions to the boarding gate may be displayed to the user. With reference to FIG. 1, when the user device 102 is the smartphone, then the virtual path and the directions to the boarding gate may be displayed to the user via the smartphone of the user. By way of an example, the virtual path and the directions to the boarding gate may be displayed to the user via his smartphone, overlaid on the airport (i.e., the environment). Further, at step 504, a change in the current location of the user may be identified. The change in the current location of the user may be identified based a change identified in a position of the user. Upon identifying the change in the current location of the user, at step 506, the virtual path and the directions to the boarding gate may be updated based on the identified change. Further, at step 508, distance and time to the boarding gate may be displayed to the user based on his current location. In an embodiment, the distance and the time to the boarding gate may be updated based on the change identified in the current location of the user.

Figure 6:
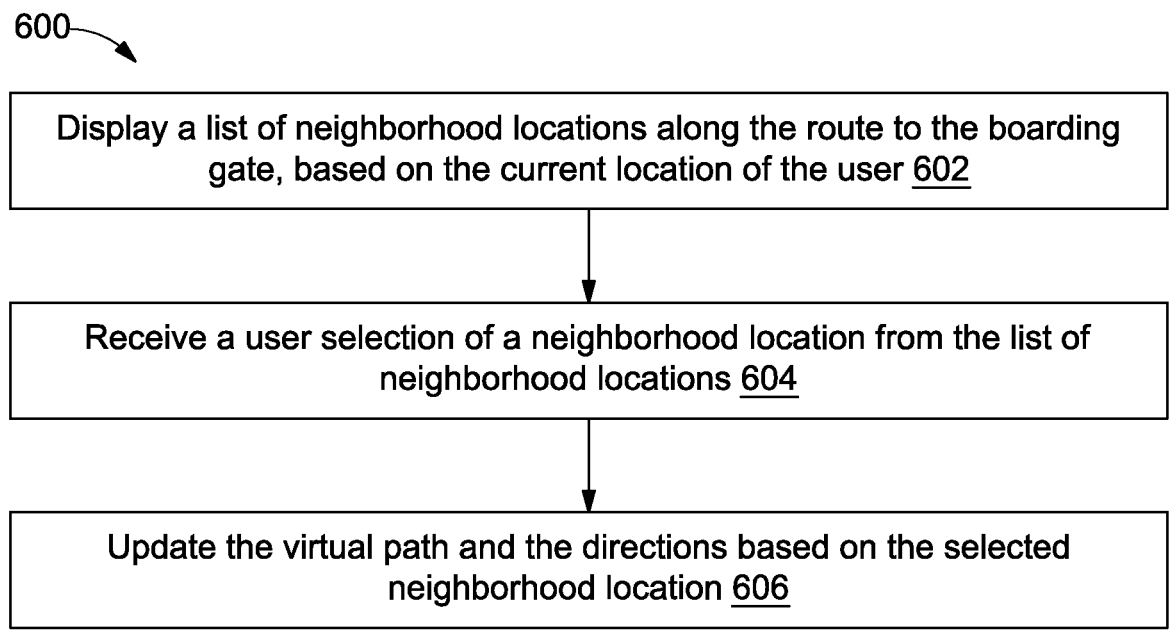
FIG. 6 illustrates a flowchart of a method of updating a virtual path and directions based on a neighborhood location selected by a user, in accordance with an embodiment.

Referring now to FIG. 6, a flowchart of a method 600 of updating a virtual path and directions based on a neighborhood location selected by a user is illustrated, in accordance with an embodiment. Initially at step 602, a list of neighborhood locations along the mixed reality route to the boarding gate may be displayed to the user. In an embodiment, the list of the neighborhood locations may be displayed to the user based on the current location of the user. Examples of the list of neighborhood location may include a cafeteria, a lounge, shopping stores, and liquor shops, restrooms, etc. Upon displaying the list of neighborhood locations along the mixed reality route to the user, at step 604, a user selection of a neighborhood location from the list of neighborhood locations may be received from the user. The user may select the neighborhood location from the list of neighborhood locations based upon his interest and needs. In some embodiment, based upon the user selection, user's interest may be determined to create a user profile that will be saved for future use. Further, based the neighborhood location selected by the user from the list of neighborhood locations, at step 606, the virtual path and the directions to reach the boarding gate may be updated. It should be noted that, the updated virtual path and the directions may include a virtual path and directions to the selected neighborhood location along the virtual path and the directions generated to reach the desired location.

Figure 7:
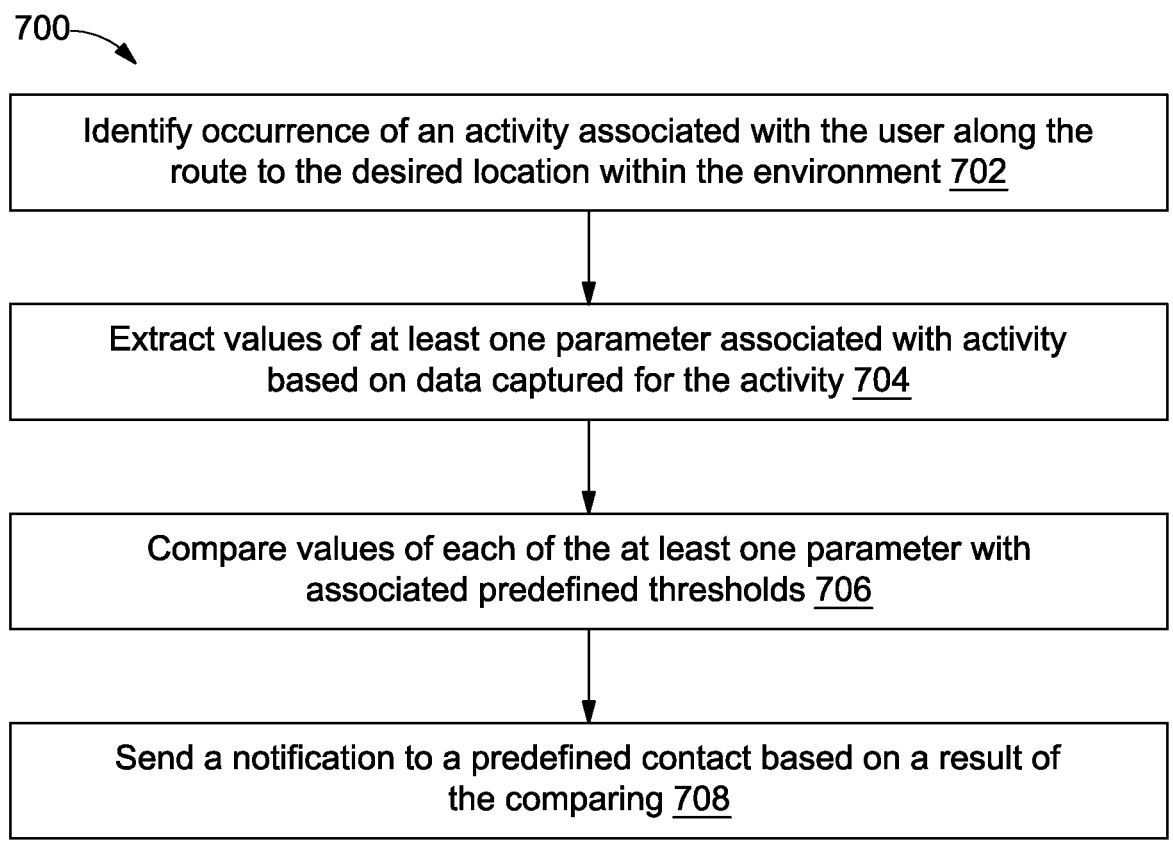
FIG. 7 illustrates a flowchart of a method for sending a notification to a predefined contact, in accordance with an embodiment.

Referring now to FIG. 7, a flowchart of a method 700 for sending a notification to a predefined contact is illustrated, in accordance with an embodiment. At step 702, an occurrence of an activity associated with the user may be identified. The occurrence of activity may be identified along the mixed reality route to the desired location within the environment. Examples of the activity associated with the user may include, but is not limited to, being stationary at a pre-defined location, falling, slipping, shouting, walking, climbing stairs, erratic biometric parameters, passing specific points of interest, and running.

In order to identify the occurrence of the activity associated with the user, at step 704, values of at least one parameter associated with the activity may be extracted. The values of the at least one parameter may be extracted based on data captured for the activity. In an embodiment, the data corresponding to each activity associated with the user may be captured with the help of one or more devices, such as, smartphones, smart watches, smart bracelets, various health monitoring sensors, and wearable devices. Examples of the at least one parameter associated with the activity may include, but is not limited to, current location of the user, duration of performing the activity, intensity of performing the activity, and other related health monitoring parameters, such as, blood pressure, acceleration, calories burnt, heart rate, and the like.

Upon extracting the values of the at least one parameter associated with the activity, at step 706, the values of each of the at least one parameter may be compared with an associated predefined threshold. Further, based on the comparison of the values of each of the at least one parameter with the associated predefined threshold, at step 708, a notification may be sent to a predefined contact based on a result of the comparing. In an embodiment, the pre-defined contact may correspond to an emergency contact saved by the user. The notification to the predefined contact may be sent in the form of the text message or the email to alert person having the pre-defined contact about the activity. In an embodiment, the user may define (save) the predefined contact prior to start of journey. Alternatively, the user may change details of the predefined contact any time as per his requirement. The details of the predefined contact may be saved to the user profile for future use.

Figure 8:
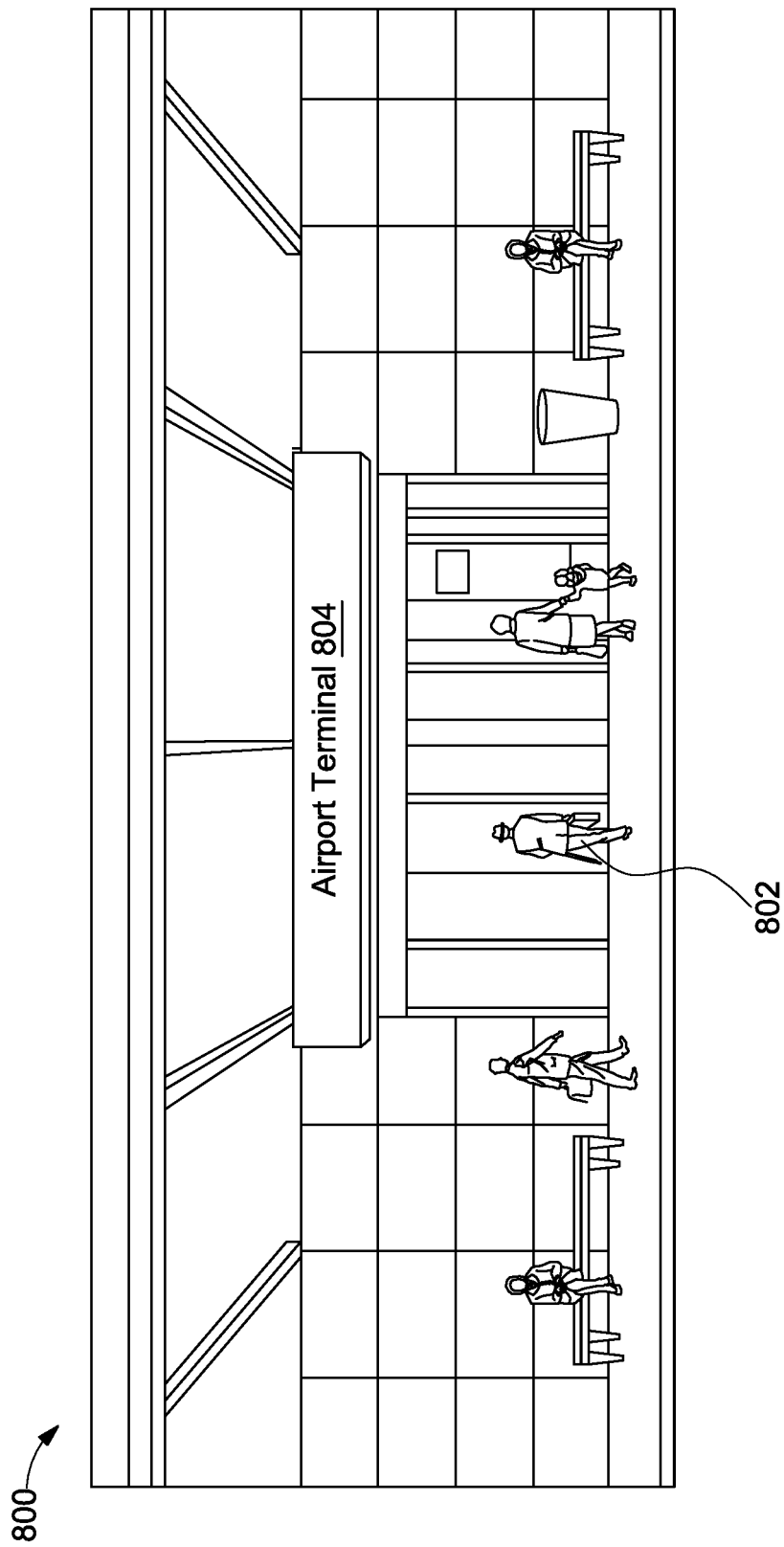
FIG. 8 illustrates a pictorial representation of guiding a user to a desired location within an environment, in accordance with an exemplary embodiment.

Referring now to FIG. 8, a pictorial representation of guiding a user 802 to a desired location within an environment is illustrated, in accordance with an exemplary embodiment. As depicted via the present FIG. 8, the environment may correspond to an airport 800. Consider a scenario where the user 802 may want to board a flight from the airport 800, in order to reach a predetermined destination. Initially, the user 802 may perform check-in and collect a boarding pass issued to him by an associated airline for boarding the flight. The issued boarding pass may include a QR code, i.e., the machine-readable mark coupled to the boarding pass.

Further, as depicted in present FIG. 8, in order to board the flight, initially, the user 802 may arrive on an airport terminal 804 of the airport 800. Upon arriving at the airport terminal 804, the user 802 may want to reach to a boarding gate designated to board his flight scheduled at a predefined time. In current scenario, the boarding gate may correspond to the desired location that the user 802 may want to reach. In order to reach to the boarding gate from the airport terminal 804, the user 802 may scan the QR code coupled to the boarding pass issued to him. The QR code may be scanned to receive data corresponding to the airport form the QR code. This has been further explained with reference to FIG. 9.

Figure 9:
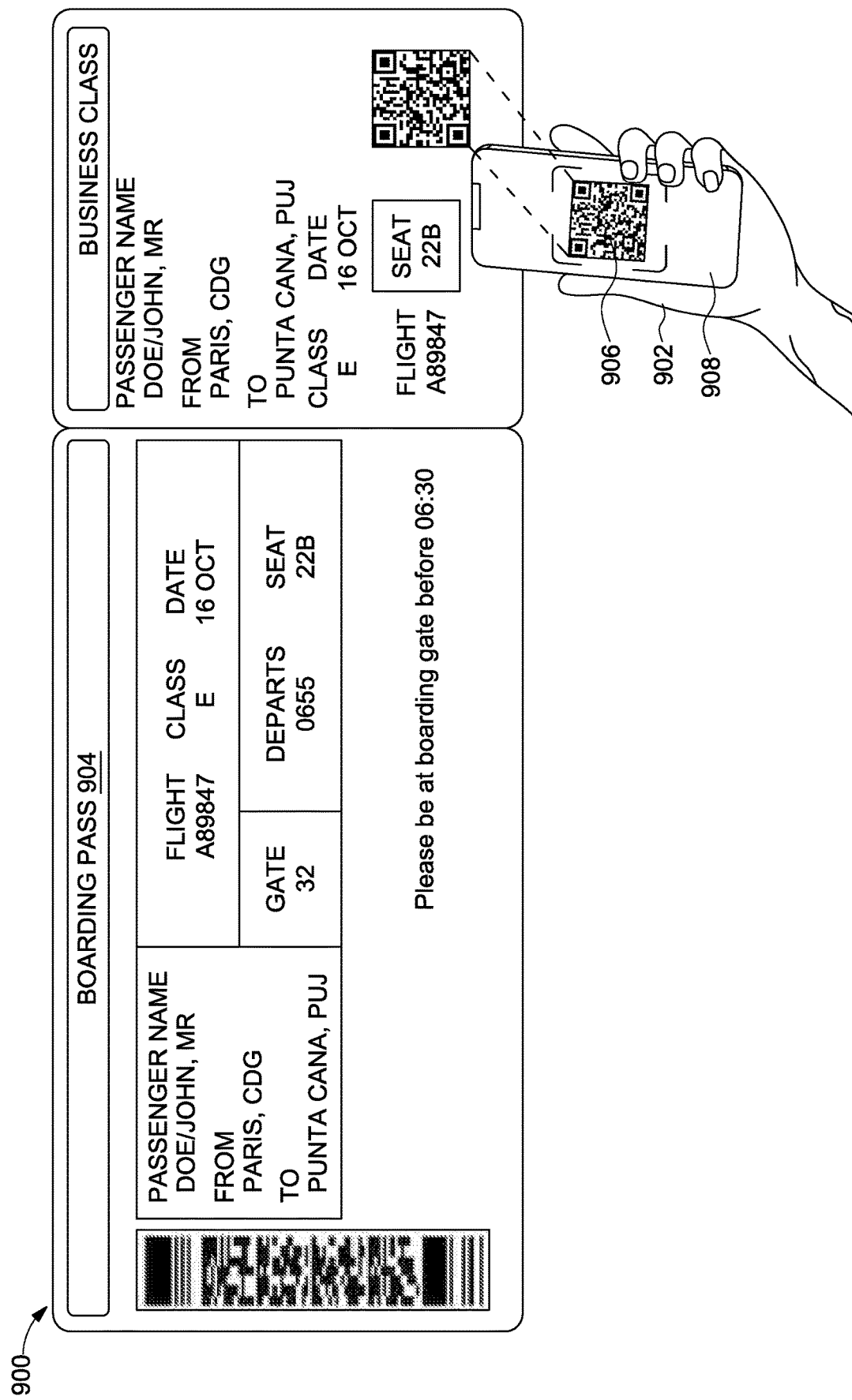
FIG. 9 illustrates a pictorial representation of scanning a QR code coupled to a boarding pass of a user, in accordance with an exemplary embodiment.

Referring now to FIG. 9, a pictorial representation 900 of scanning a QR code 906 coupled to a boarding pass 904 of a user 902 is illustrated, in accordance with an exemplary embodiment. As will be appreciated, FIG. 9 is explained in conjunction with FIG. 8. The airport may correspond to the airport 800. The user 902 (same as the user 802) may scan the QR code 906 coupled to the boarding pass 904 issued to him. In order to receive the data corresponding to the airport, the user 902 may scan the QR code 906 printed on the boarding pass 904 via a user device 908 (e.g., a smartphone owned by the user 902). With reference to FIG. 1, when the user device 908 may correspond to the user device 102. In an embodiment, the user 902 may scan the QR code 906 printed on the boarding pass 904 via the sensor (i.e., the image sensor of the camera) of the user device 908.

Upon scanning the QR code 906, the data corresponding to the airport may be extracted from a database of a server (same as the database 114 of the server 112). The data corresponding to the airport may include geographical information of the airport. The geographical information of the airport may include the layout data of the airport. The layout data of the airport may include airport terminals, terminal entry gates, waiting area, seating lounge, boarding gates, ticket counters, shopping stores, food stores, cafeteria, restrooms, runways, and the like. In addition to the layout data of the airport, the data corresponding to the user 902 may be extracted upon scanning the QR code by the sensor of the user device 908. In current scenario, the data corresponding to the user 902 may include personal details and flight details of the user 902. As depicted via the present FIG. 9, the personal details of the user may include name, age, gender, etc. In addition, the flight details of the user 902 may include origin, destination, departure time, arrival time, seat no., boarding gate no., class, etc.

Figure 10:
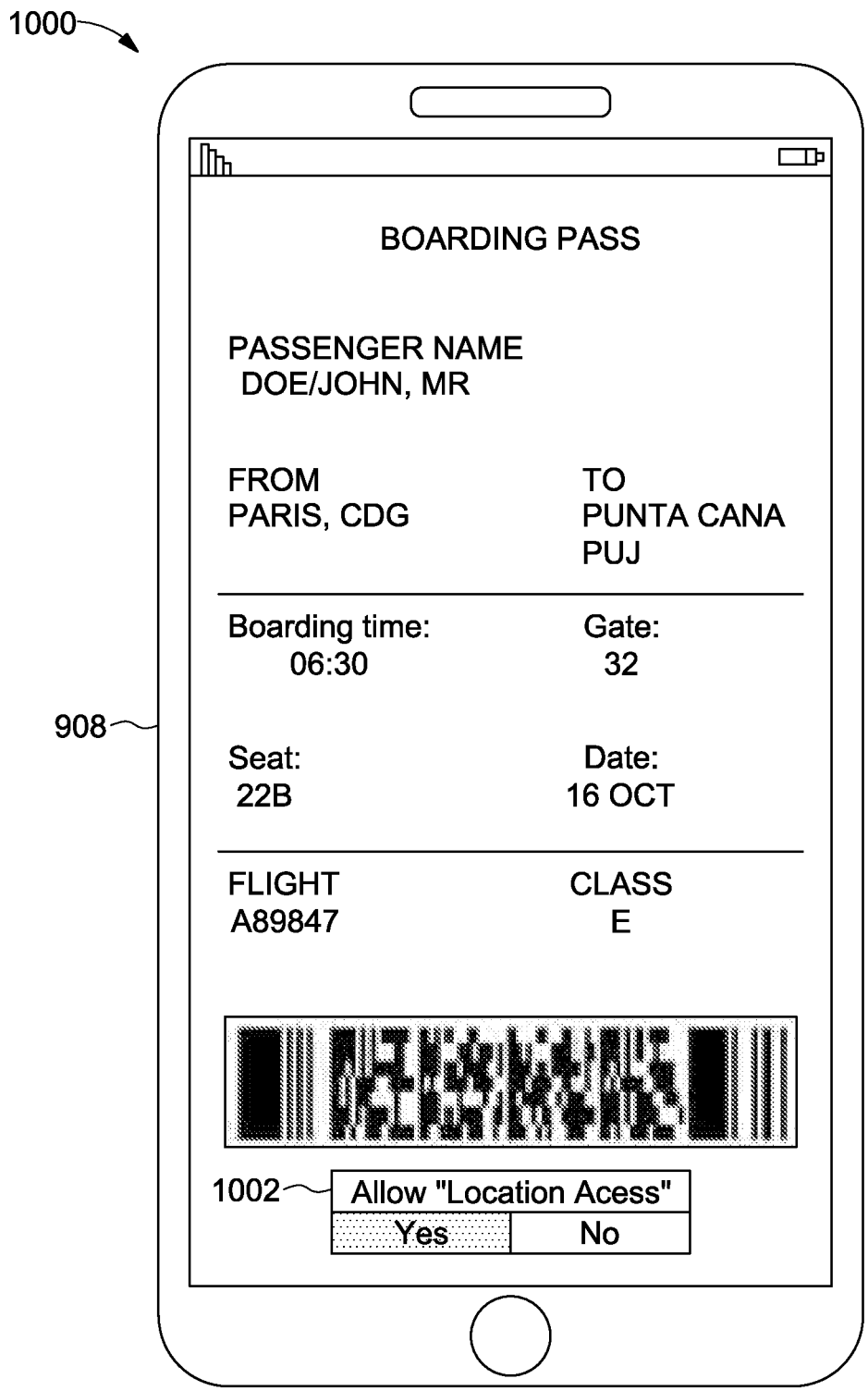
FIG. 10 depicts a GUI representing data extracted upon reading a QR code coupled to a boarding pass of a user, in accordance with an exemplary embodiment.

The data extracted corresponding to the user 902 by reading the QR code may be displayed to the user via the user device 908, as depicted via a Graphical User Interface (GUI) 1000 in FIG. 10. In an embodiment, the GUI 1000 may correspond to a GUI of the user device 908. Further, the user 902 may verify the displayed data based on one or more verification checks. By way of an example, the user 902 may verify his original name (spelling) with the name retrieved by reading the QR code printed on the boarding pass 904. Once the airport data and the user data are extracted, a current location of the user may be determined. In order to determine the current location of the user 902, a prompt represented as, "Location Access" 1002, may be automatically generated and rendered to the user 902 via the user device 908, as depicted via the GUI 1000. The prompt may be generated for asking permission to allow access of the current location of the user 902. Further, the user 902 may allow access of the current location by clicking on a 'Yes' icon displayed to the user 902 as depicted via the GUI 1000. Once the user 902 enables the location access permission, the current location of the user 902 may be determined by the user device 908. With reference to FIG. 8, the current location of the user 902 (same as the user 802) may be at the airport terminal 804.

Figure 11:
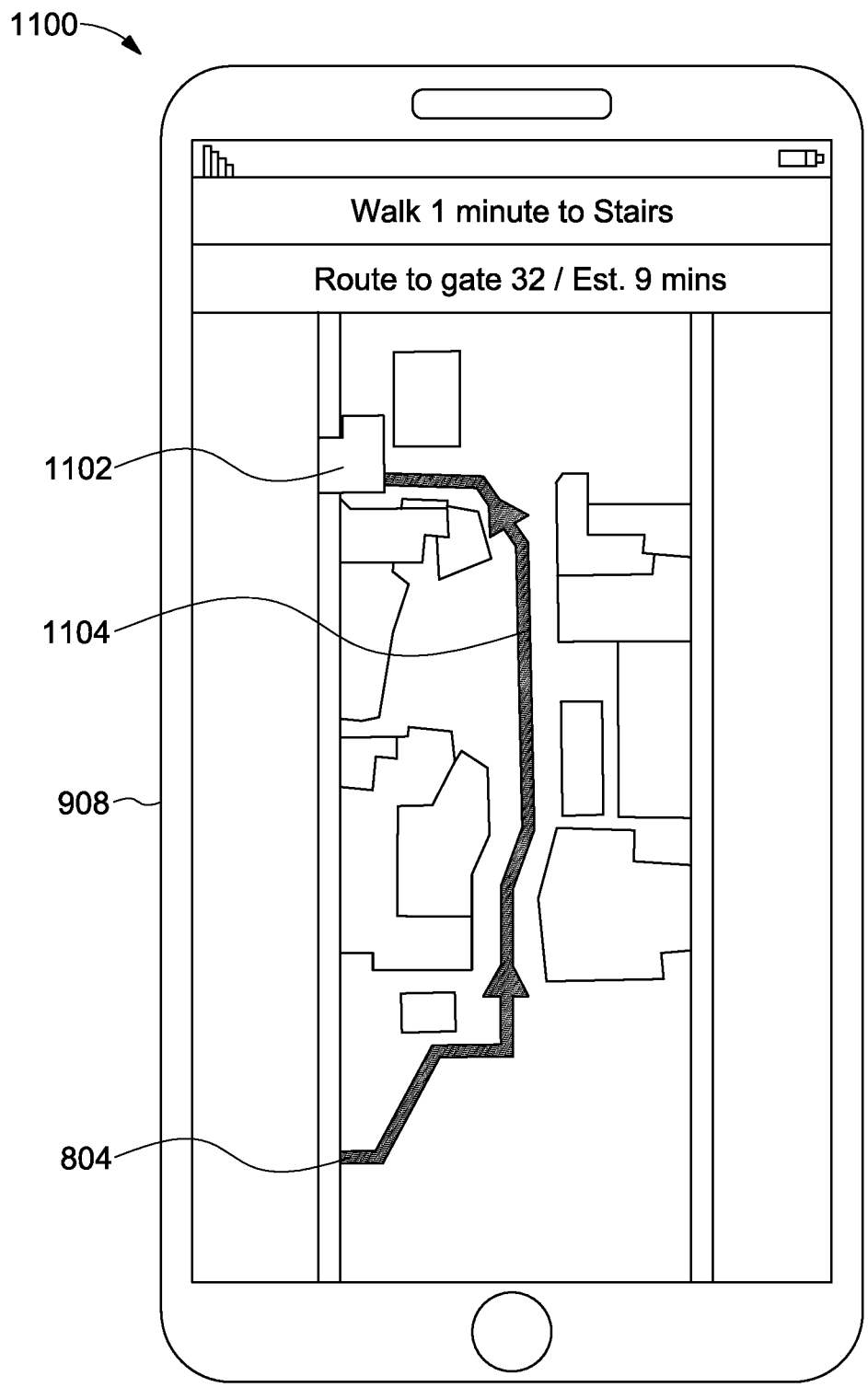
FIG. 11 represents a GUI depicting a virtual path and directions to reach a boarding gate, in accordance with an exemplary embodiment.

Referring now to FIG. 11, a GUI 1100 depicting a virtual path 1104 and directions generated to reach a boarding gate is represented, in accordance with an exemplary embodiment. In continuation to above FIG. 8 to FIG. 10, the mixed reality route may be generated from the airport terminal 804 (i.e., the current location) to the desired location (i.e., a boarding gate 1102). The mixed reality route may be generated to guide the user 902 to the boarding gate 1102 from the airport terminal 804 within the airport (environment). In an embodiment, the mixed reality route may be generated based on the spatial data extracted for the boarding gate 1102 and the current location of the user.

The generated mixed reality route may be rendered to the user 902 overlaid over the airport environment. As depicted via the GUI 1100, the generated mixed reality route may be displayed to the user as a virtual path 1104 and directions to the boarding gate 1102, from the airport terminal 804. In order to reach the boarding gate 1102, the user 902 may follow the virtual path 1104 displayed via the GUI 1100 of the user device 908. In addition to the virtual path 1104 and the directions, distance and time required to reach the boarding gate 1102 may also be displayed to the user 902 as depicted via the GUI 1100. In other words, the virtual path 1104 may provide turn-by-turn directions, total distance to be covered to reach the boarding gate 1102, and estimated time required to reach the boarding gate 1102. By way of an example, the virtual path 1104 may be depicted to the user 902 as "walk '100 meters (m)' straight or walk 1 minutes to stairs, after walking '100 m' straight, turn right and walk straight for '200 m'". Further, as the user 902 moves towards the boarding gate 1102, the current location (i.e., the airport terminal 804) of the user 802 may keep on changing and the virtual path 1104 and the directions may be updated based on the change identified in the current location of the user 902.

Figure 12A:
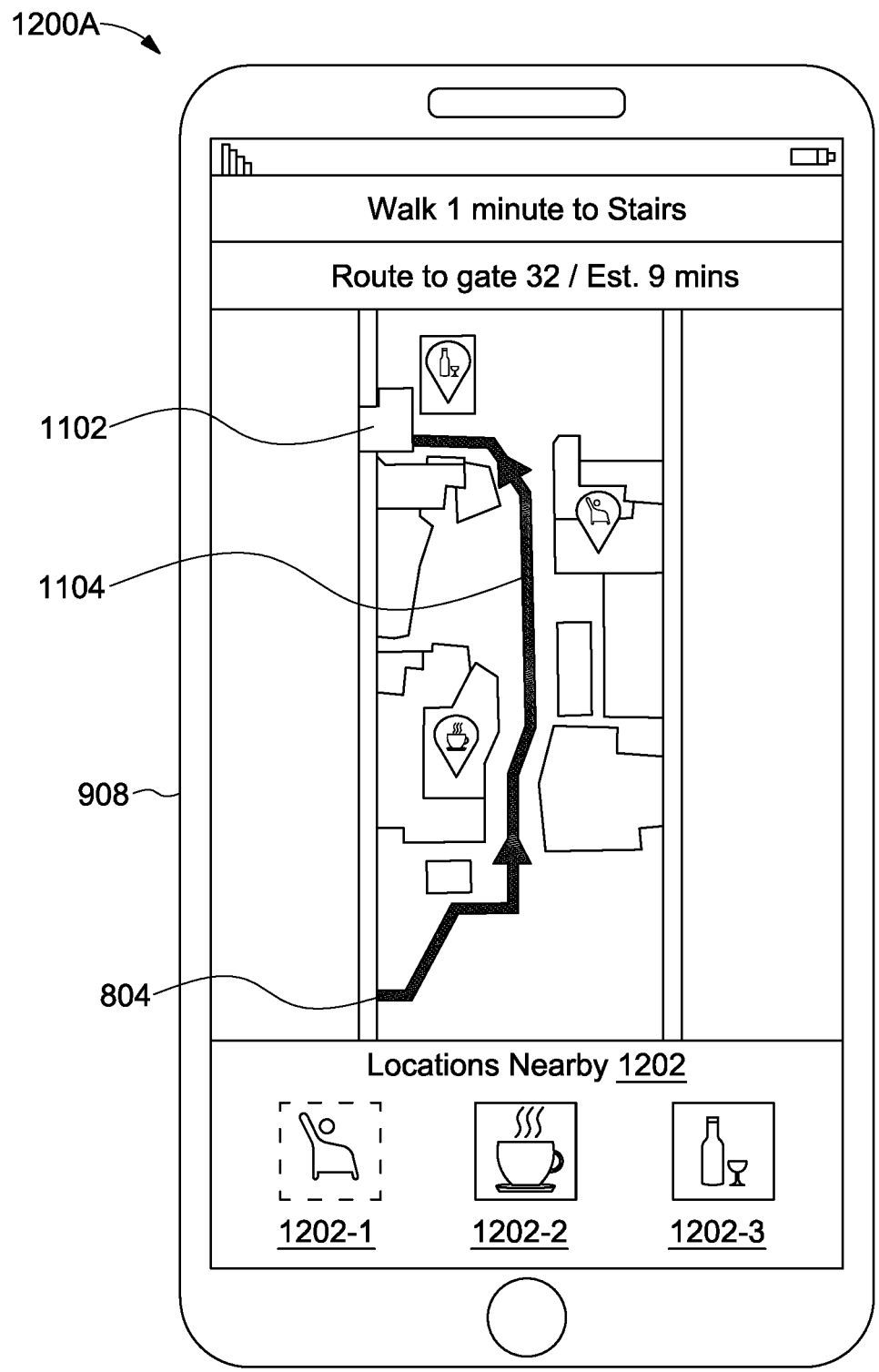
FIG. 12A represents a GUI depicting a list of neighborhood location displayed to a user, in accordance with an exemplary embodiment.
Figure 12B:
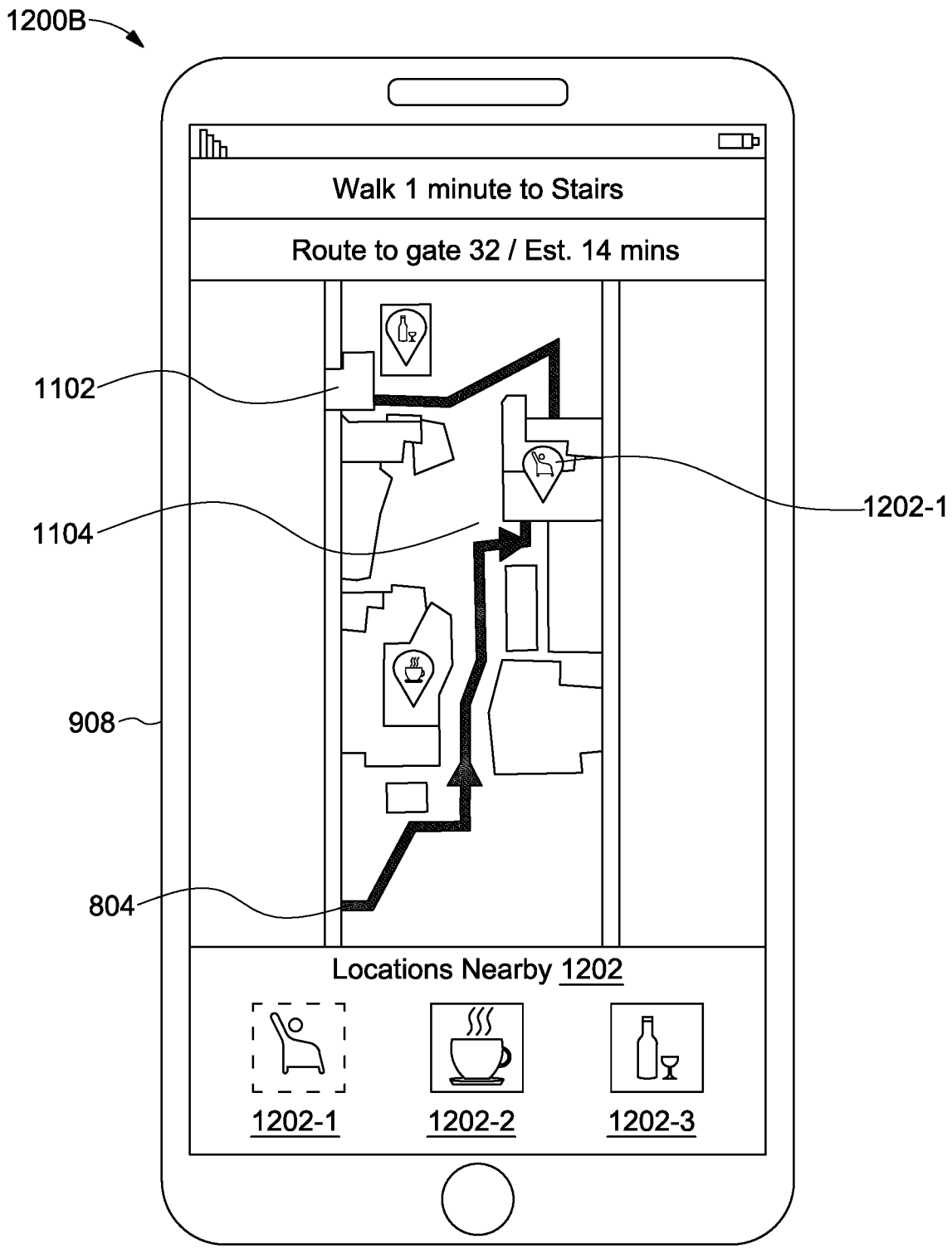
FIG. 12B represents a GUI depicting a virtual path and directions updated based on a selected neighborhood location, in accordance with an exemplary embodiment.

Referring now to FIG. 12A, a GUI 1200A depicts a list of neighborhood location displayed to a user is represented, in accordance with an exemplary embodiment. As will be appreciated, FIG. 12A is explained in continuation to above FIG. 8 to FIG. 11. Once the virtual path 1104 to the boarding gate 1102 is generated and rendered to the user 902, a list of neighborhood locations 1202 along the virtual path 1104 to the boarding gate 1102 may be displayed to the user 902, as depicted via the GUI 1200A. Examples of the list of neighborhood locations 1202 may include a cafeteria, a lounge, a shopping store, and a liquor shop, restrooms, etc. As will be appreciated, for ease of explanation, the list of neighborhood locations displayed to the user 908 may include three neighborhood locations along the virtual path 1104 to the boarding gate 1102, i.e., 'a lounge 1202-1', 'a cafeteria 1202-2, and 'a liquor shop 1202-3' are displayed via the GUI 1200A of the present FIG. 12A.

Once the list of neighborhood location 1202 is rendered to the user 902, the user 902 may select a neighborhood location from the list of neighborhood locations. As depicted via the GUI 1200A, the user 902 may select an icon representing 'the lounge 1202-1' depicted via a dashed line. Further, the user selection of the neighborhood location may be saved to create the user profile for the future use. The user profile may include personal details of the user 904 and user's preferences. By way of an example, if the user 904 selects the liquor shop from the list of neighborhood locations 1202 shown to the user, then the liquor shop suggestions would be primarily shown to the user in future journey.

Further, based on the user selection of the lounge 1202-1 from the list of neighborhood locations 1202, the virtual path 1104 and the directions to the boarding gate 1102 may be updated. The virtual path 1104 and the directions updated based on the selected neighborhood location, i.e., the lounge 1202-1 is represented via a GUI 1200B of FIG. 12B. As depicted via the GUI 1200B, the updated virtual path 1104 and the directions to the boarding gate 1102 may include directions to the lounge 1202-1. Further, based on the update in the virtual path 1104 and the directions, the distance and the time estimated to reach to the boarding gate 1102, may be further updated and displayed to the user 902. In an embodiment, the update in the distance and the time estimated to reach the boarding gate 1102 may enable the user to accordingly decide whether to visit the selected neighborhood location (i.e., the lounge 1202-1) or not as per departure time of the flight.

Figure 13:
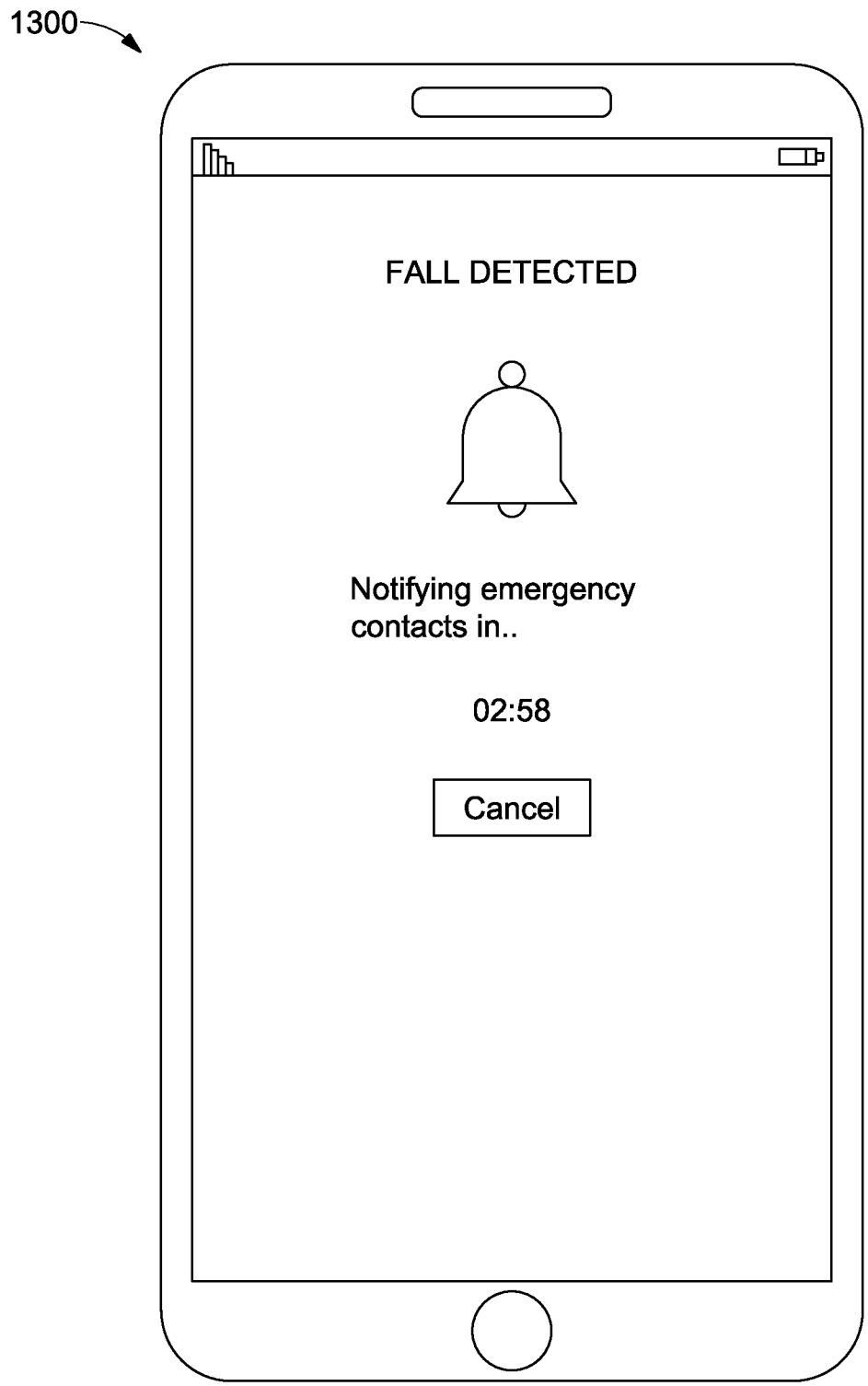
FIG. 13 represents a GUI generated upon identifying an occurrence of an activity associated with a user along a virtual path to a boarding gate, in accordance with an exemplary embodiment.

Referring now to FIG. 13, a GUI 1300 generated upon identifying an occurrence of an activity associated with a user is represented, in accordance with an exemplary embodiment. FIG. 13 is explained in continuation to FIG. 8 to FIG. 12B. Once the user 902 starts navigating via the virtual path 1104 displayed to the user 902, the user 902 may perform multiple activities along the virtual path 1104 to the boarding gate 1102. By way of an example, in order to reach to the boarding gate 1102, the user 802 may run for some time, walk, sit at a location to rest, use amenities provided at the airport terminal 804, or fall during running.

In order to identify occurrence of the activity associated with the user 902 along the displayed virtual path 1104, the values of at least one parameter associated with the activity performed by the user 902 may be extracted. In an embodiment, the values of the at least one parameter associated with the activity may be extracted based on the data captured for the activity. Examples of the at least one parameter associated with the activity may include, but are not limited to, current location of the user 902, duration of performing the activity, body temperature of the user 902 during the activity, intensity of performing the activity, and other health monitoring parameters, such as, blood pressure, acceleration, calories burnt, heart rate, or the like.

By way of an example, the occurrence of the activity, i.e., fall of the user 902 may be identified as represented via the GUI 1300. In an embodiment, the fall of the user 902 may be identified with the help of one or more devices, such as the user device 908, i.e., the smartphones, smart watch that the user 902 might be wearing, smart bracelet, and various health monitoring sensors, and other wearable devices. For example, an accelerometer in combination with other sensors may be used for identifying the fall of the user 902 by comparing the extracted value of the at least one parameter with the associated predefined threshold. As depicted via the GUI 1300, upon detecting the fall, a message displaying "notifying emergency contact in: 02 minutes and 8 seconds may be displayed to the user 902. In present example, if the user 802 is conscious after the fall, the user 802 may click on a "cancel" button with "02 minutes and 8 seconds", then the notification may not be sent to the pre-defined contact. However, when the user 902 is not conscious after the fall, the notification may be sent to the pre-defined contact (i.e., the emergency contact) after the displayed time-period, i.e., '02 minutes and 08 seconds'.

Figure 14:
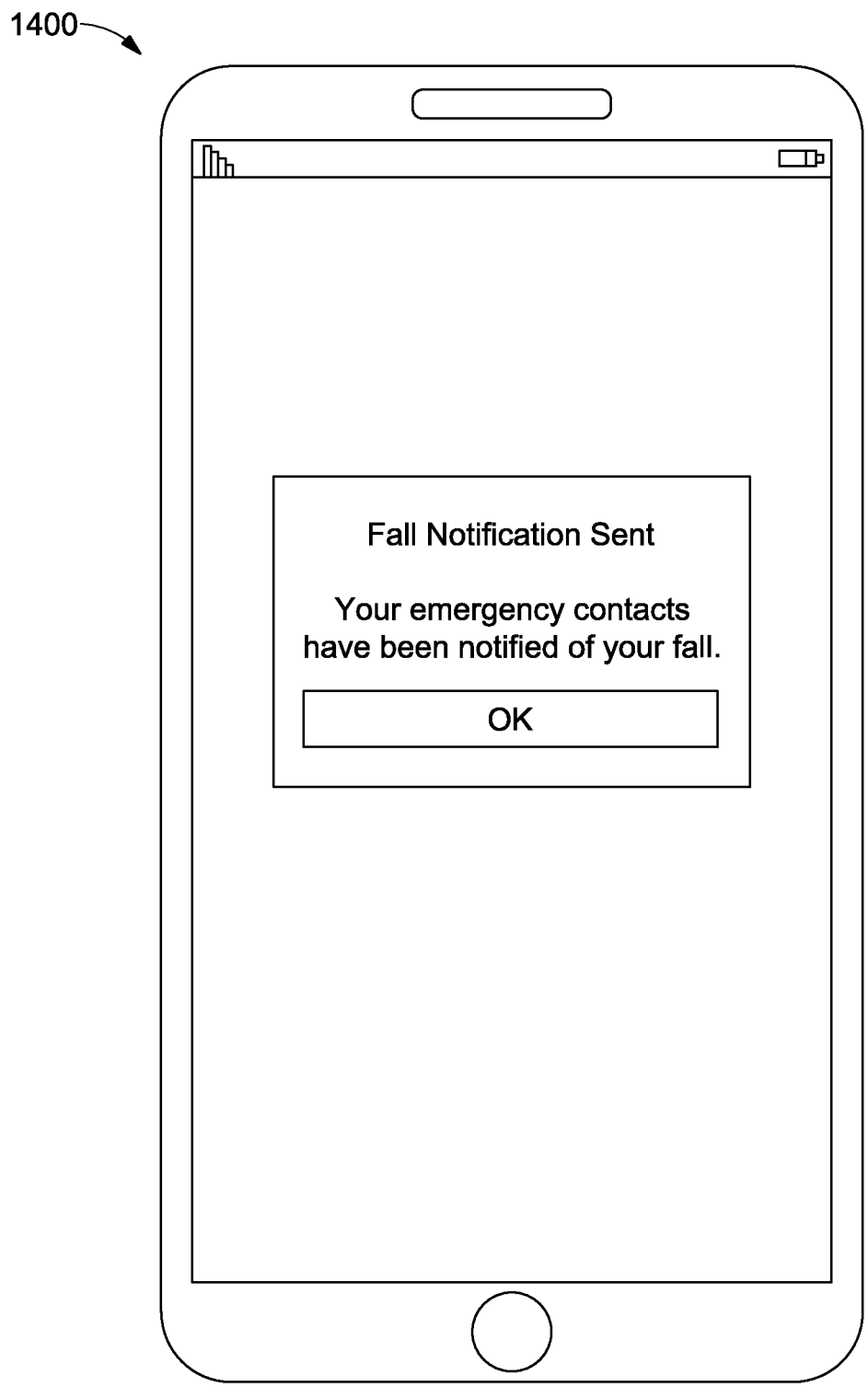
FIG. 14 represents a GUI depicting a notification sent to a pre-defined contact upon identifying an activity, in accordance with an exemplary embodiment.

Once the notification is sent to the pre-defined contact, i.e., a message, e.g., "Your emergency contact has been notified of your fall" displaying that the pre-defined contact has been notified may be displayed to the user 902 via the user device 908, as depicted via a GUI 1400 of FIG. 14. In some embodiment, the pre-defined contact of the user 902 may be notified of the user's current activity in order to enable the pre-defined contact of the user 902 to keep track on the user 902. This may enable the pre-defined contact to perform necessary action in case of any emergency. By way of an example, when the pre-defined contact of the user 902 may be notified of the user's fall activity, then the pre-defined contact of the user 902 may contact concerned authorities at the airport terminal 804 and ask for help on behalf of the user 902. As will be appreciated, the user 804 may update details of the pre-defined contact any time. In addition, the user 902 may be enabled to define a specific pre-defined contact for specific trip.

Various embodiments provide method and system for guiding a person to desired locations within an environment. The disclosed method and system may receive data corresponding to the environment from a machine-readable mark in response to scanning the machine-readable mark. The data corresponding to the environment may comprise geographical information associated with the environment. Further, the disclosed method and system may receive a user input for a desired location within the environment. The disclosed method and system may iteratively determine a current location of a user within the environment in response to receiving the user input. In addition, the disclosed method and the system extracting, by the user device, spatial data of the desired location within the environment from the geographical information. Thereafter, the disclosed method and system may dynamically and iteratively generate a mixed reality route to the desired location overlaid over the environment. The mixed reality route may include directions to reach the desired location.

The disclosed method and system may provide some advantages like, the disclosed method and the system may enable user to quickly reach the boarding gate at the airport terminal by displaying route to the boarding gate along with the time required to reach the boarding gate This helps to save a lot of time of the user required for searching for path to the boarding gate of the user's flight. Moreover, the disclosed method and system may be beneficial for non-frequent travelers as the disclosed method and the system may provide assist them to better guide to the boarding gate by optimizing time required to reach the boarding gate. Further, the disclosed method and the system may enable users to search for any desired location (e.g., shopping stores, food court, etc.) with the airport that are present on route to the boarding gate by displaying them the list of neighborhood locations. In addition, the disclosed method and system may enable other family members to easy monitor activities performed by the user at the airport terminal by allowing user to save a personal contact number of the family member as a pre-defined contact. Further, the disclosed method and system may provide quick assistance to the user in case of any emergency during the user's stay at the airport terminal by notifying the family member or concerned authorities in case of the emergency. This may ensure secure and hassle-free journey for the user at the airport terminal.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for guiding a user to desired locations within an environment, the method comprising:
   receiving, by a user device, data corresponding to the environment from a machine-readable mark in response to scanning the machine-readable mark, wherein the data corresponding to the environment comprises geographical information associated with the environment;
   receiving, by the user device, a user input for a desired location within the environment;
   iteratively determining, by the user device, a current location of a user within the environment in response to receiving the user input;
   extracting, by the user device, spatial data of the desired location within the environment from the geographical information; and
   dynamically and iteratively generating, by the user device, a mixed reality route to the desired location overlaid over the environment, wherein the mixed reality route comprises directions to reach the desired location;
   identifying an occurrence of an activity associated with the user along the mixed reality route to the desired location within the environment;
      wherein the activity comprises being stationary at a pre-defined location, falling, slipping, shouting, walking, climbing stairs, erratic biometric parameters, passing specific points of interest, and running;
   extracting values of at least one parameter associated with the activity based on data captured for the activity;

comparing values of each of the at least one parameter with an associated predefined threshold; and sending a notification to a predefined contact based on a result of the comparing.

2. The method of claim 1, further comprising scanning, via the user device, the machine-readable mark, wherein the scanning comprises:

reading, via a sensor of the user device, the machine-readable mark; and extracting the geographical information in response to reading the machine-readable mark, wherein the geographical information comprises layout data of the environment.

3. The method of claim 2, wherein the environment is an airport, the desired location is a boarding gate at the airport, and the machine-readable mark is cooperatively coupled to a boarding pass issued to the user.

4. The method of claim 3, further comprising, receiving, via the machine-readable mark, data corresponding to the user, wherein the data corresponding to the user comprises personal details and flight details of the user.

5. The method of claim 4, further comprising verifying, from the user, the data received corresponding to the user, based on one or more verification checks.

6. The method of claim 3, wherein data corresponding to the airport and the boarding gate are received in response to the scanning of the machine-readable mark on the boarding pass.

7. The method of claim 3, wherein generating the mixed reality route comprises:

displaying, via the user device, a virtual path and the directions to the boarding gate;

identifying a change in the current location of the user; and updating, via the user device, the virtual path and the directions based on the identified change.

8. The method of claim 7, further comprising displaying to the user, via the user device, distance and time to the boarding gate.

9. The method of claim 7, further comprising:

displaying, via the user device, a list of neighborhood locations along the mixed reality route to the boarding gate based on the current location of the user;

receiving, via the user device, a user selection of a neighborhood location from the list of neighborhood locations; and updating, via the user device, the virtual path and the directions based on the selected neighborhood location.

10. The method of claim 1, wherein the machine-readable mark is one of a bar code, a Quick Response (QR) code, and a Radio-frequency identification (RFID).

11. A system for guiding a user to desired locations within an environment, the system comprising:

a processor; and a memory coupled to the processor, wherein the memory stores processor executable instructions, which, on execution, causes the processor to:

receive data corresponding to the environment from a machine-readable mark in response to scanning the machine-readable mark, wherein the data corresponding to the environment comprises geographical information associated with the environment;

receive a user input for a desired location within the environment;

iteratively determine a current location of a user within the environment in response to receiving the user input;

extract spatial data of the desired location within the environment from the geographical information; and dynamically and iteratively generate a mixed reality route to the desired location overlaid over the environment, wherein the mixed reality route comprises directions to reach the desired location;

identify an occurrence of an activity associated with the user along the mixed reality route to the desired location within the environment, wherein the activity comprises being stationary at a pre-defined location, falling, slipping, shouting, walking, climbing stairs, erratic biometric parameters, passing specific points of interest, and running;

extract values of at least one parameter associated with the activity based on data captured for the activity;

compare values of each of the at least one parameter with an associated predefined threshold; and send a notification to a predefined contact based on a result of the comparing.

12. The system of claim 11, wherein the processor executable instructions further cause the processor to:

scan the machine-readable mark, and wherein, to scan the machine-readable mark, the processor executable instructions further cause the processor to:

read the machine-readable mark; and extract the geographical information in response to reading the machine-readable mark, wherein the geographical information comprises layout data of the environment, and wherein the environment is an airport, the desired location is a boarding gate at the airport, and the machine-readable mark is cooperatively coupled to a boarding pass issued to the user, and wherein data corresponding to the airport and the boarding gate are received in response to the scanning of the machine-readable mark on the boarding pass.

13. The system of claim 12, wherein the processor executable instructions further cause the processor to:

receive the data corresponding to the user, and wherein the data corresponding to the user comprises personal details and flight details of the user; and verify the data received corresponding to the user, based on one or more verification checks.

14. The system of claim 12, wherein, to generate the mixed reality route, the processor executable instructions further cause the processor to:

display a virtual path and the directions to the boarding gate;

identify a change in the current location of the user;

update the virtual path and the directions based on the identified change;

display distance and time to the boarding gate to the user.

15. The system of claim 14, wherein the processor executable instructions further cause the processor to:

display a list of neighborhood locations along the mixed reality route to the boarding gate based on the current location of the user;

receive a user selection of a neighborhood location from the list of neighborhood locations; and update the virtual path and the directions based on the selected neighbourhood location.

16. The system of claim 11, wherein the machine-readable mark is one of a bar code, a Quick Response (QR) code, and a Radio-frequency identification (RFID).

17. A non-transitory computer-readable medium storing computer-executable instructions for guiding a user to desired locations within an environment, when executed by a processor, cause the processor to perform operations comprises:
- receiving data corresponding to the environment from a machine-readable mark in response to scanning the machine-readable mark, wherein the data corresponding to the environment comprises geographical information associated with the environment;
- receiving a user input for a desired location within the environment;
- iteratively determining a current location of a user within the environment in response to receiving the user input;
- extracting spatial data of the desired location within the environment from the geographical information; and
- dynamically and iteratively generating a mixed reality route to the desired location overlaid over the environment, wherein the mixed reality route comprises directions to reach the desired location;
- identifying an occurrence of an activity associated with the user along the mixed reality route to the desired location within the environment;
  - wherein the activity comprises being stationary at a pre-defined location, falling, slipping, shouting, walking, climbing stairs, erratic biometric parameters, passing specific points of interest, and running;
- extracting values of at least one parameter associated with the activity based on data captured for the activity;
- comparing values of each of the at least one parameter with an associated predefined threshold; and
- sending a notification to a predefined contact based on a result of the comparing.

* * * * *